United States Patent
Chen et al.

(10) Patent No.: US 9,442,580 B2
(45) Date of Patent: Sep. 13, 2016

(54) ELECTRONIC APPARATUS AND TOUCH OPERATING METHOD THEREOF

(71) Applicant: Acer Incorporated, New Taipei (TW)

(72) Inventors: Chih-Lung Chen, New Taipei (TW); Chao-Kuang Yang, New Taipei (TW)

(73) Assignee: Acer Incorporated, New Taipei (TW)

( * ) Notice: Subject to any disclaimer, the term of this patent is extended or adjusted under 35 U.S.C. 154(b) by 197 days.

(21) Appl. No.: 14/221,291

(22) Filed: Mar. 21, 2014

(65) Prior Publication Data

US 2015/0116228 A1    Apr. 30, 2015

(30) Foreign Application Priority Data

Oct. 25, 2013    (TW) ................. 102138567

(51) Int. Cl.
  *G06F 3/033*   (2013.01)
  *G06F 3/0354*  (2013.01)
  *G06F 3/044*   (2006.01)

(52) U.S. Cl.
  CPC ........... *G06F 3/03545* (2013.01); *G06F 3/044* (2013.01)

(58) Field of Classification Search
  None
  See application file for complete search history.

(56) References Cited

U.S. PATENT DOCUMENTS

| | | | |
|---|---|---|---|
| 2010/0099394 A1* | 4/2010 | Hainzl | G06F 1/32 455/418 |
| 2010/0177218 A1 | 7/2010 | Ohuchi | |
| 2011/0164000 A1 | 7/2011 | Pance | |
| 2013/0106731 A1 | 5/2013 | Yilmaz et al. | |
| 2013/0113754 A1 | 5/2013 | Lee | |
| 2014/0022193 A1* | 1/2014 | Kim | G06F 3/0488 345/173 |
| 2014/0168177 A1* | 6/2014 | Mkrtchyan | G06F 3/041 345/179 |

FOREIGN PATENT DOCUMENTS

| | | |
|---|---|---|
| CN | 101639750 | 2/2010 |
| TW | 346586 | 12/1998 |
| TW | 201124888 | 7/2011 |

* cited by examiner

*Primary Examiner* — Joseph Haley
*Assistant Examiner* — Ifedayo Iluyomade
(74) *Attorney, Agent, or Firm* — Jianq Chyun IP Office

(57) ABSTRACT

An electronic apparatus and a touch operating method thereof are provided. The touch operating method is adapted to an electronic apparatus having a touch display and includes the following steps. A touch performed on the touch display by a touch input device is detected. According to this touch, a dielectric parameter of the touch input device is determined. An operating function corresponding to the dielectric parameter is executed.

8 Claims, 3 Drawing Sheets

| Dielectric parameter \ Setting | Color setting 42 | Line style setting 44 | Line thickness setting 46 | Function setting 48 |
|---|---|---|---|---|
| Dielectric parameter 32 | Blue | ——— | 0.25 pt | Copy |
| Dielectric parameter 34 | Red | ············· | 0.75 pt | Restore |
| Dielectric parameter 36 | Green | — — — — | 1 pt | Cut |
| Dielectric parameter 38 | Yellow | — ·· — ·· — | 3 pt | Erase |

300

```
┌─────────────────────────────────────────┐
│ Detect a first touch performed on a touch│──S202
│ display by a touch input device          │
└─────────────────────────────────────────┘
                   │
                   ▼
┌─────────────────────────────────────────┐
│ Determine a dielectric parameter of the touch│──S204
│ input device according to the first touch    │
└─────────────────────────────────────────┘
                   │
                   ▼
┌─────────────────────────────────────────┐
│ Execute an operating function corresponding │──S206
│ to the dielectric parameter                 │
└─────────────────────────────────────────┘
```

FIG. 2

| Dielectric parameter \ Setting | Color setting 42 | Line style setting 44 | Line thickness setting 46 | Function setting 48 |
|---|---|---|---|---|
| Dielectric parameter 32 | Blue | ——— | 0.25 pt | Copy |
| Dielectric parameter 34 | Red | ·········· | 0.75 pt | Restore |
| Dielectric parameter 36 | Green | - - - - - | 1 pt | Cut |
| Dielectric parameter 38 | Yellow | —··—··— | 3 pt | Erase |

FIG. 3

ELECTRONIC APPARATUS AND TOUCH OPERATING METHOD THEREOF

CROSS-REFERENCE TO RELATED APPLICATION

This application claims the priority benefit of Taiwan application serial no. 102138567, filed on Oct. 25, 2013. The entirety of the above-mentioned patent application is hereby incorporated by reference herein and made a part of this specification.

BACKGROUND OF THE INVENTION

1. Field of the Invention

The present invention generally relates to a touch operating technique, in particular, to a touch operating method and an electronic apparatus using touch input devices to perform operations.

2. Description of Related Art

Recently, following the continue advances in technology, functions of electronic apparatuses become more and more powerful, and people's dependence on the electronic apparatuses is also increasing. In terms of the current electronic apparatuses on the market, manufacturers are very active in promoting the applications of touch panels, and thus many electronic apparatuses are equipped with a touch screen to provide users with a more user-friendly operating environment. The users may select various function options on the touch display to carry out operations, such as data input or data editing, either by using a stylus or by directly tapping on the touch display with a finger.

However, currently, when a user uses the stylus to perform the operations, if it is required to switch the color or the line thickness written by the stylus, or to execute other editing functions, then the user must do so by using application programs installed on the electronic apparatuses, such that the user may change the editing effect (e.g., color or line thickness) written by the stylus only after firstly selecting the corresponding operation settings (e.g., editing settings and so forth) on the application programs. As a result, when the user uses the stylus to operate the electronic apparatus, it takes a lot of time to find and set the required operation settings, and thus is very inconvenient.

SUMMARY OF THE INVENTION

Accordingly, the invention provides a touch operating method and an electronic apparatus enabling a user to intuitively and quickly execute a corresponding operating function with the electronic apparatus, and thereby increases the user's convenience in operating the electronic apparatus.

The invention provides a touch operating method adapted to an electronic apparatus having a touch display, and the touch operating method includes the following steps. A first touch performed on the touch display by a touch input device is detected. According to the first touch, a dielectric parameter of the touch input device is determined. An operating function corresponding to the dielectric parameter is executed.

The invention provides an electronic apparatus including a touch display, a detection module and an application module. The detection module is coupled to the touch display for detecting a first touch performed on the touch display by a touch input device and determining a dielectric parameter of the touch input device according to the first touch. The application module is coupled to the detection module for executing an operating function corresponding to the dielectric parameter.

In view of foregoing, in the electronic apparatus of the present embodiment and the touch operating method thereof, the electronic apparatus detects the dielectric parameter of the touch input device and executes the operating function corresponding to the dielectric parameter. As a result, by selecting the touch input device to operate the electronic apparatus, user may operate the electronic apparatus more intuitively and conveniently.

In order to make the aforementioned and other features and advantages of the present application more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2 is a flow chart illustrating a touch operating method according to an embodiment of the invention.

FIG. 3 is a schematic diagram illustrating an operating function comparison table according to an embodiment of the invention.

DESCRIPTION OF THE EMBODIMENTS

General multicolor pens may be configured with refills of multiple colors to allow a user to manually switch to the desired color refill to perform writing. If the user may intuitively switch the corresponding operations of a stylus when using the stylus to operate an electronic apparatus, then the convenience for the user in operating the electronic apparatus is bound to be improved. In view of the above reasons, a touch operating method and an electronic apparatus are proposed by the invention. In order to make the contents of the invention more comprehensible, several embodiments are provided in below as implementable examples.

Figure 1A:
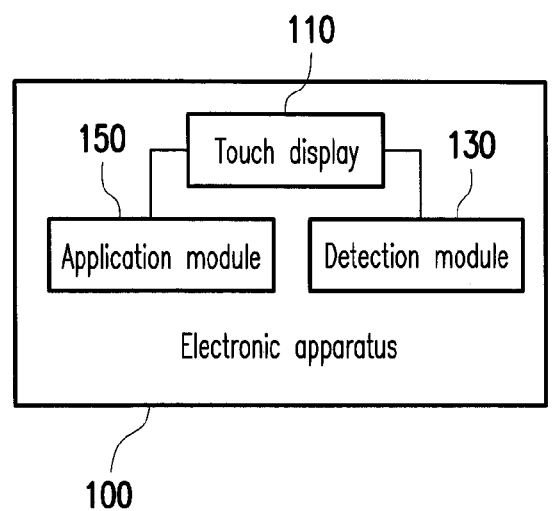
FIG. 1A is a block diagram illustrating an electronic apparatus according to an embodiment of the invention.

FIG. 1A is a block diagram illustrating an electronic apparatus according to an embodiment of the invention. Referring to FIG. 1A, an electronic apparatus 100 of the present embodiment, for example, is an electronic apparatus having a touch display, such a notebook computer, a Tablet PC, a personal digital assistant (PDA), a mobile phone, an E-books, a video game device and so forth, but the invention is not limited thereto. The electronic apparatus 100 of the present embodiment includes a touch display 110, a detection module 130 and an application module 150, and the functions thereof are analyzed as follows.

The touch display 110, for example, is a display device integrated with a touch panel, and may provide display and input functions at the same time. The display device, for example, is a liquid crystal display (LCD), a light-emitting diode (LED) display, a field emission display (FED) or other type of display; and the touch panel, for example, is a resistive touch display or a capacitive touch display, but the invention is not limited thereto.

Figure 1B:
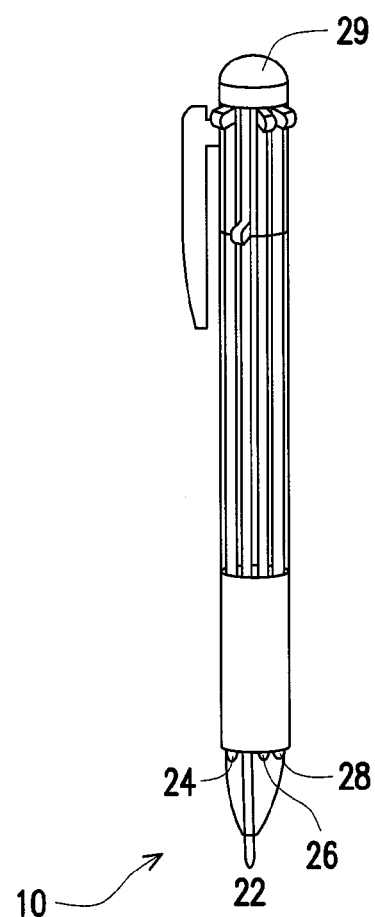
FIG. 1B is a schematic diagram illustrating a touch input device according to an embodiment of the invention.

The detection module 130 is coupled to the touch display 110 for detecting a touch performed on the touch display 110 by a touch input device and determining a dielectric parameter of the touch input device. Wherein, the touch input device, for example, is one of the heads of a stylus, and each of the touch input devices has a different dielectric parameter. For instance, FIG. 1B is a schematic diagram illustrating a touch input device according to an embodiment of the invention. Referring to FIG. 1B, a stylus 10 may have a plurality of touch input devices 22, 24, 26, 28 and 29, and the touch input devices 22, 24, 26, 28 and 29, for example, are the multiple heads of the stylus 10, wherein the touch input devices 22, 24, 26 and 28, for example, are disposed at one end of the stylus 10, while the touch input device 29, for example, is disposed at the other end of the stylus 10. Herein, explanations are provided using the touch input devices 22, 24, 26, 28 and 29, but the present embodiment does not intend to limit the amount of the touch input device in the stylus 10. In addition, the touch input devices 22, 24, 26, 28 and 29 have different dielectric parameters. Specifically, when using the stylus 10, a user may switch the touch input devices 22, 24, 26 and 28 of the stylus 10 or the user may use the touch input device 29 configured at the other end, so as to perform touch on the touch display 110 using the touch input devices having different dielectric parameters. As such, when the user is using the different touch input devices, the detection module 130 may determine different dielectric parameters since the dielectric parameter of each of the touch input devices is different. It is to be noted that, the above has taken the stylus 10 as an example to describe the implementation of the touch input devices, but the invention is not limited thereto, such that the touch input devices may also be objects of other forms. Moreover, a material of the touch input devices may be insulating material, such as non-woven fabric or plastic, but not limited thereto.

The application module 150 is coupled to the detection module 130. The application module 150, for example, is a program installed in an operating system of the electronic apparatus 100 which may detect the dielectric parameter of the touch input device according to the detection module 130 and then execute an operating function corresponding to this dielectric parameter. For instance, the application module 150 may display a trace of the touch input device on the touch display 110 according to a display setting (e.g., at least one of a color setting, line style setting or a line thickness setting) corresponding to the dielectric parameter, or execute at least one of a copy function, a restore function, a cut function, a paste function or an erase function according to a function setting corresponding to the dielectric parameter, but not limited thereto.

In addition, the detection module 130 and the application module 150, for example, are hardware devices assembled using logic circuit elements, so as to execute a touch operating method of the present embodiment. Otherwise, the detection module 130 and the application module 150 may also be programs stored in a storage media (e.g., memory or hard drive) of the electronic apparatus 100 which may be loaded with a processor of the electronic apparatus 100, so as to execute the touch operating method of the present embodiment, but is not limited thereto.

FIG. 2 is a flow chart illustrating a touch operating method according to an embodiment of the invention. Referring to FIG. 1A and FIG. 2 at the same time, the touch operating method of the present embodiment is adapted to the electronic apparatus 100 shown in FIG. 1A; and detail steps of the touch operating method, accompanied by the various elements of the electronic apparatus 100, are described in below.

Firstly, in step S202, the detection module 130 detects a first touch performed on the touch display 110 by the touch input device. Next, in step S204, the detection module 130 determines the dielectric parameter of the touch input device according to the first touch. Herein, for different types of the touch display 110, the detection module 130 has different touch signals according to different touch detection means, so as to obtain the corresponding dielectric parameter based on the touch signal. For instance, in terms of the capacitive touch display, the detection module 130 may determine the dielectric parameter of the touch input device based on the size of capacitance generated when the touch input device touches the touch display 110, wherein the detection module 130 may find the dielectric parameter corresponded by each different capacitance value according to the capacitance and a dielectric parameter comparison table. Or, in terms of the resistive touch display, the detection module 130 may also determine the dielectric parameter of the touch input device by using the size of resistance generated when the touch input device touches the touch display 110, wherein the detection module 130 may find the dielectric parameter corresponded by each different resistance value according to the resistance and a dielectric parameter comparison table.

Afterward, in step S206, the application module 150 executes the operating function corresponding to the dielectric parameter. Herein, the application module 150 may find one or more operating function settings respectively corresponded by each dielectric parameter through an operating function comparison table, so as to execute the operating function with these settings. In addition, the operating function comparison table may be built in the application module 150, stored at the storage media of the electronic apparatus 100 or stored in a cloud server, but not limited thereto.

Furthermore, the application module 150 may select the display setting corresponding to the dielectric parameter, such as at least one of the color setting, the line style setting or the line thickness setting, or a combination thereof, but not limited thereto. Also, the application module 150 displays the trace of the touch input device on the touch display 110 based on this display setting. Certainly, the application module 150 may also select the function setting corresponding to the dielectric parameter, such as the copy function, the restore function, the erase function (e.g., erasing the displayed line, text or figures), the cut function or the paste function, to execute the corresponding operations. As such, the user may directly produce the corresponding editing effect on the touch display 110 through the touch input device. Moreover, when the user is to produce different editing effects, the user merely has to switch to a different touch input device to perform the operation, and then the application module 150 may execute the operating function corresponding to the dielectric parameter of this touch input device.

FIG. 3 is a schematic diagram illustrating an operating function comparison table according to an embodiment of the invention. Referring to FIG. 3, an operating function comparison table 300 records a plurality of dielectric parameters 32, 34, 36 and 38 and settings corresponding to a variety of operating functions, such as a color setting 42, a line style setting 44, a line thickness setting 46 and a function setting 48. Herein, when the user operates on the touch display 110 through the touch input device, the application module 150 may find the setting corresponding to the dielectric parameter according to the dielectric parameter of the touch input device determined by the detection module 130, so as to execute the corresponding operating function.

For instance, when the dielectric parameter of the touch input device is the dielectric parameter 32, the application module 150 may set the color of the trace of the touch input device touching on the touch display 110 to be blue according to the color setting 42. It is to be noted that, each of the dielectric parameter in the operating function comparison table 300 may be corresponded to a plurality of settings at the same time. For instance, when the touch input device has the dielectric parameter 32, the application module 150 may simultaneously set the color of the trace of the touch input device touching on the touch display 110 to be blue according to the color setting 42, set the line style of the trace of the touch input device touching on the touch display 110 according to the line style setting 44, or set the thickness of the trace of the touch input device touching on the touch display 110 to be 0.25 pt according to the line thickness setting 46. Certainly, the dielectric parameter may also be corresponded to the function setting, such that when the touch input device has the dielectric parameter 32, the application module 150 may set to provide the copy function when the touch input device touches the touch display 110.

It is to be noted that, the application module 150 may preset one or more settings corresponding to the dielectric parameters in the operating function comparison table 300, so as to execute various operating functions corresponded by each of the dielectric parameters according to these settings. Otherwise, the user may also personally set one or more operating functions corresponded by each of the dielectric parameters, such that the user may personally set the color, the line style and size, the function or other editing tool corresponded by each of the dielectric parameters, and not limited to the ones described in above. Then, the application module 150 may execute the operating function corresponded by the dielectric parameter according to the user setting.

In the following below, another embodiment, accompanied by the operating function comparison table 300 of FIG. 3, is provided with detailed descriptions. Assuming that the user uses a stylus with 4 touch input devices to perform the input, and these 4 touch input devices respectively have the dielectric parameters 32, 34, 36 and 38, wherein the dielectric parameter 32 is corresponded to the setting of "a 0.25 pt blue line", the dielectric parameter 34 is corresponded to the setting of "restore", the dielectric parameter 36 is corresponded to the setting of "1 pt green line", and the dielectric parameter 38 is corresponded to the setting of "erase". Herein, when using the touch input device having the dielectric parameter 32 in this stylus to perform the operation, the user may draw a blue line with 0.25 pt in size on the touch display 110. Now, if the user intends to draw to a green line, then the user may change to use the touch input device having the dielectric parameter 36 to perform the operation, so that a green line with 1 pt in size may be drawn on the touch display 110. If the user intends to restore the drawn green line, then the user may change to use the touch input device having the dielectric parameter 34 to perform the operation, and thus the application module 150 may execute the restore function. In addition, if the user intends to erase a portion of the green line, then the user may change to use the touch input device having the dielectric parameter 38 to perform the operation, so as to erase the green line.

According to the above, when the user is to change the written color or style, execute the restore, copy, cut or erase function during the process of writing, the user merely has to switch the touch input device in the stylus; and after the switching, when another touch input device touches the touch display 110, the detection module 130 determines the different dielectric parameter, so that the application module 150 executes the corresponding operating function. As such, the user may eliminate the step of manually selecting a specific function, and may intuitively and conveniently perform the operation on the electronic apparatus.

Noteworthily, when the electronic apparatus 100 is in a standby state or in a locked state, the detection module 130 may also determine whether to convert the electronic apparatus 100 from a suspend state into an active state or to unlock the electronic apparatus 100 according to a touch point of the touch input device on the touch display 110 and an area touched by the palm of the user on the touch display 110, and when the electronic apparatus 100 is converted into the working state or being unlocked, the application module 150 may directly execute the corresponding operating function according the dielectric parameter corresponded by the touch input device. In the following below, one more embodiment is provided with detailed descriptions.

Figure 4:
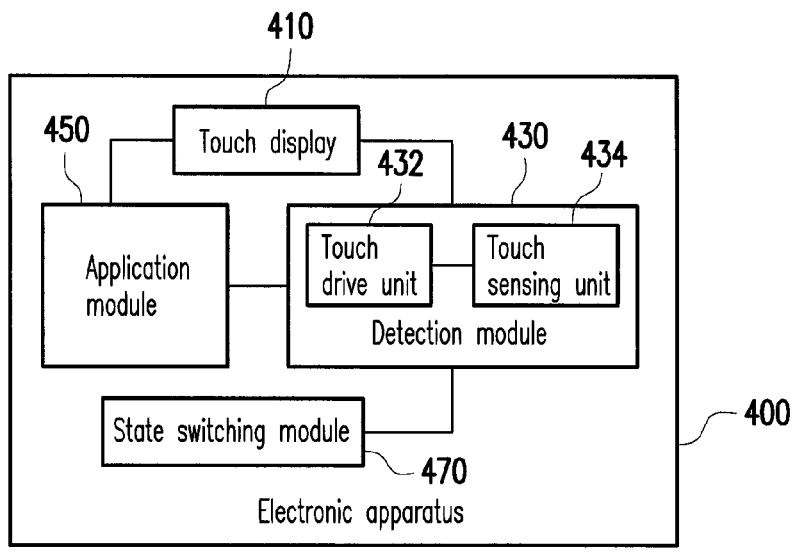
FIG. 4 is a block diagram illustrating an electronic apparatus according to an embodiment of the invention.

FIG. 4 is a block diagram illustrating an electronic apparatus according to an embodiment of the invention. Referring to FIG. 1A and FIG. 4, an electronic apparatus 400 in FIG. 4 is similar to the electronic apparatus 100 in FIG. 1A, a difference lies in that: a detection module 430 of the electronic apparatus 400 in FIG. 4 may include a touch sensing unit 432 and a touch drive unit 434, and the electronic apparatus 400 may further include a state switching module 470.

In one embodiment, the touch sensing unit 432 in the detection module 430, for example, senses a sensing signal of a touch input device touching on the touch display 410, so as to determine whether the sensing signal is an effective touch and determine the dielectric parameter of the touch input device according to the sensing signal. Wherein, when the sensing signal is an effective touch, the electronic apparatus 400 may be converted from the standby state into the working state or be unlocked, and the touch sensing unit 432 sends the determination results of the sensing signal and the dielectric parameter to the touch drive unit 434. Now, the touch drive unit 434 commands the application module 450 to execute the corresponding operating function according to the sensing signal and the dielectric parameter. In another embodiment, the touch sensing unit 432 may also sense the sensing signal of the touch input device touching on the touch display 410 to determine whether the sensing signal is an effective touch. When the sensing signal is an effective touch, the touch sensing unit 432 sends the sensing signal to the touch drive unit 434. Now, the touch drive unit 434 receives the sensing signal to determine the dielectric parameter of the touch input device, so as to command the application module 450 to execute the corresponding operating function according to the sensing signal and the dielectric parameter. In other words, through the touch sensing unit 432 or the touch drive unit 434, the detection module 430 may determine the dielectric parameter of the touch input device according to the detected sensing signal.

In addition, the state switching module 470 is coupled to the detection module 430 for switching the states of the electronic apparatus 400, such as enabling the electronic apparatus 400 to convert from the standby state into the working state, or when the electronic apparatus 400 is screen locked, the state switching module 470 may unlock the electronic apparatus 400. In the present embodiment, the state switching module 470, for example, is a hardware device assembled with logical circuit elements for executing the touch operating method of the present embodiment. Otherwise, the state switching module 470 may also be a program stored in a storage media of the electronic apparatus 400 for executing the touch operating method of the present embodiment through a processor of the electronic apparatus 400, but the present embodiment is not limited thereto.

Moreover, other components, configuration relationships, usages, effects and so forth of the electronic apparatus 400 in FIG. 4 are similar to that of the electronic apparatus 100 in FIG. 1A, and thus are not to be repeated herein.

Figure 5:
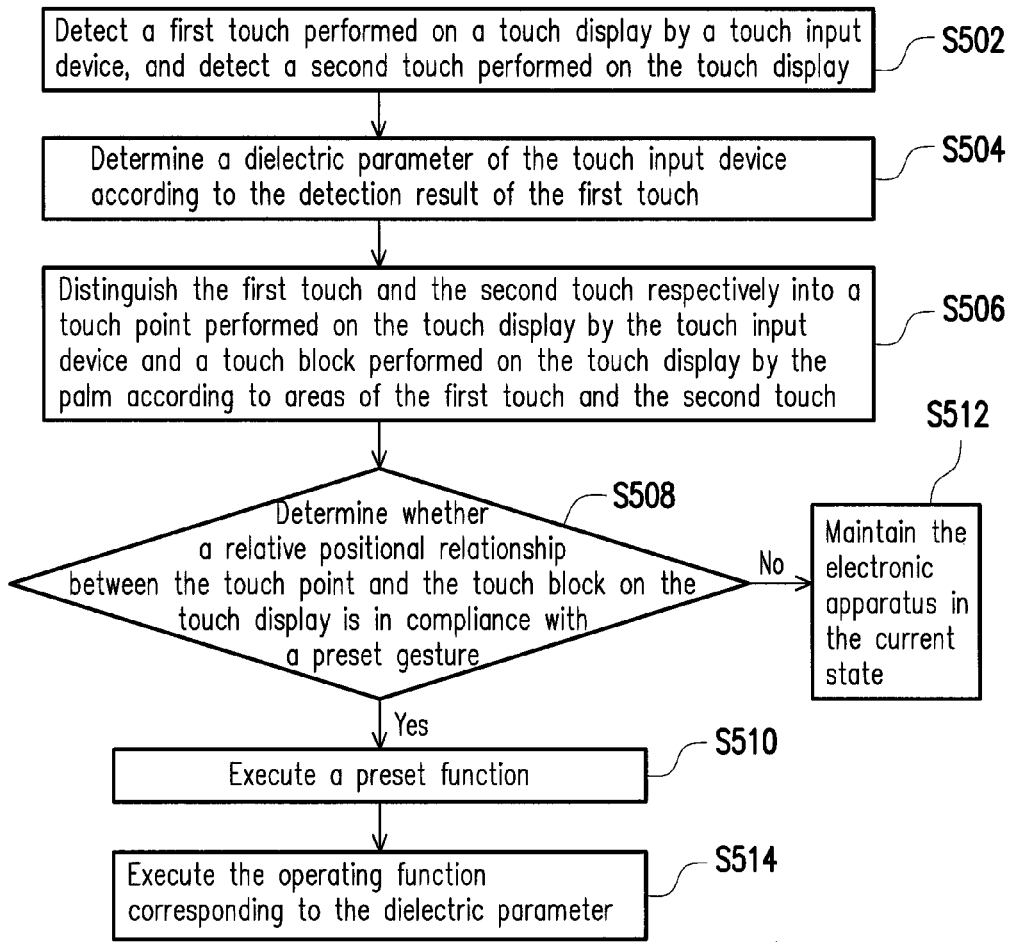
FIG. 5 is a flow chart illustrating a touch operating method according to an embodiment of the invention.

FIG. 5 is a flow chart illustrating a touch operating method according to an embodiment of the invention. Referring to FIG. 4 and FIG. 5 at the same time, in step S502, the detection module 430 detects the first touch performed on the touch display 410 by the touch input device, and detects the second touch performed on the touch display 410. Herein, the second touch, for example, is a touch performed on the touch display 410 by the palm of the user. Specifically, when the user uses the touch input device to operate the electronic apparatus 400, the hand of the user holds the touch input device with the writing posture, and the hand is leaned against or placed on the touch display 410, so as to achieve the purpose of touch operating the electronic apparatus 400. Therefore, when the user uses the touch input device to operate the electronic apparatus 400, the palm of the user and the touch input device both touch the touch display 410, and then the detection module 430 detects the first touch and the second touch respectively produced by the touch input device and the palm.

Next, in step S504, the detection module 430 determines the dielectric parameter of the touch input device according to the detection result of the first touch. And, in step S506, the detection module 430 distinguishes the first touch and the second touch respectively into a touch point performed on the touch display 410 by the touch input device and a touch block performed on the touch display 410 by the palm according to areas of the first touch and the second touch. Since the touch formed by the touch input device constitutes a touch point with a small area on the touch display 410, as in comparison with the touch formed by the palm, the touch formed by the palm constitutes a touch block with a large area on the touch display 410. Accordingly, based on the area being touched, the detection module 430 may identify the touch point performed on the touch display 410 by the touch input device and the touch block performed on the touch display 410 by the palm.

In step S508, the detection module 430 determines whether a relative positional relationship between the touch point and the touch block on the touch display 410 is in compliance with a preset gesture. In detail, the detection module 430 may further obtain the relative positional relationship between the touch point and the touch block on the touch display 410 according to information, such as coordinate positions, of the touch point and the touch block, so as to determine whether the user gesture is in compliance with the preset gesture. In the present embodiment, the preset gesture, for example, is the posture of the palm in holding the touch input device. For instance, when the hand of the user is holding the touch input device with a normal writing posture, the touch point formed by the touch input device and the touch block formed by the palm have a specific relationship therebetween; for example, a distance between the touch point and the touch block should be within a present range.

If the said relative positional relationship is in compliance with the preset gesture, then step S510 is performed, such that the state switching module 470 executes a preset function, wherein the preset function may be determined according to the user setting, and the preset function, for example, is to convert the electronic apparatus 400 from the standby state into the working state, or to unlock the electronic apparatus 400. For instance, assuming that the preset gesture is the posture of the palm in holding of the touch input device and is used for waking up the electronic apparatus 400, and when the electronic apparatus 400 in the standby state receives this gesture, it indicates that the user is to use the touch input device to operate the electronic apparatus 400; and therefore, the electronic apparatus 400 will be directly converted into the working state. Otherwise, assuming that the preset gesture is a gesture used for unlocking the electronic apparatus 400, and when the electronic apparatus 400 receives this gesture during the locked state, thus then the electronic apparatus 400 is to be unlocked. However, if the said relative positional relationship is not in compliance with the preset gesture, then in step S512, the state switching module 470 maintains the electronic apparatus 400 in the current state (e.g., the standby state or the locked state).

After the state switching module 470 executes the preset function, as shown in step S514, the application module 450 executes the operating function corresponding to the dielectric parameter. In other words, when the electronic apparatus 400 of the present embodiment is converted from the standby state into the working state or being unlocked, the detection module 430 may simultaneously detect the dielectric parameter of the touch input device and transfer the dielectric parameter to the application module 450, so that the application module 450 may select the setting corresponding to this dielectric parameter to execute the corresponding operating function according to the dielectric parameter. As such, the user may directly use the touch input device to perform operation to produce the corresponding display effect or operating function without requiring to an application program.

In view of above, when the electronic apparatus 400 is converted from the standby state into the working state or being unlocked, the detection module 430 may determine dielectric parameter of the touch input device at the same time, so that the application module 450 executes the corresponding operating function according to the current dielectric parameter. As such, after the electronic apparatus 400 is converted into the working state or being unlocked, the user may eliminate the step of manually selecting the operating function, and may intuitively and conveniently perform the operation on the electronic apparatus 400.

In summary, in the electronic apparatus and the touch operating method of the present embodiment, the electronic apparatus detects the touch performed on the touch display by the touch input device and executes the corresponding operating function according to the dielectric parameter of the touch input device. In addition, the user may personally set the operating function corresponded by the dielectric parameter of each of the touch input devices, and may intuitively switch between the different touch input devices, so as to operate the electronic apparatus through the operating function corresponded by each of the touch input devices. Thus, when using the touch input device to operate the electronic apparatus, the user may experience a use habit closer to that of a normal multicolor pen. As such, the electronic apparatus of the invention and the touch operating method thereof may increase the convenience in operating the electronic apparatus for the user.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touch operating method adapted to an electronic apparatus having a touch display, the touch operating method comprising:
    detecting a first touch performed on the touch display by a selected one of a plurality of touch input devices, wherein the touch input devices have different dielectric parameters;
    determining the dielectric parameter of the selected one of the touch input devices according to the first touch, wherein
        when the touch display is a capacitive touch display, the dielectric parameter of the selected one of the touch input devices is determined according to a dielectric-capacitance comparison table and a capacitance generated by the first touch performed on the touch display; and
        when the touch display is a resistive touch display, the dielectric parameter of the selected one of the touch input devices is determined according to a dielectric-resistive comparison table and a resistance generated by the first touch performed on the touch display; and
    executing an operating function corresponding to the dielectric parameter.

2. The touch operating method as recited claim 1, wherein the step of executing the operating function corresponding to the dielectric parameter comprises:
    displaying a trace of the touch input device on the touch display according to a display setting corresponding to the dielectric parameter, wherein the display setting comprises at least one of a color setting, a line style setting or a line thickness setting.

3. The touch operating method as recited claim 1, wherein the step of executing the operating function corresponding to the dielectric parameter further comprises:
    executing the operating function according to a function setting corresponding to the dielectric parameter, wherein the function setting comprises at least one of a copy function, a restore function, a cut function, a paste function or an erase function.

4. The touch operating method as recited claim 1 further comprising:
    while the electronic apparatus is in a standby state or a lock state, detecting the first touch and a second touch performed on the touch display;
    determining the dielectric parameter of the selected one of the touch input devices according to the first touch;
    distinguishing the first touch and the second touch into a touch point performed on the touch display by the touch input device and a touch block performed on the touch display by a palm according to areas of the first touch and the second touch;
    determining whether a relative positional relationship between the touch block and the touch point on the touch display is in compliance with a preset gesture;
    if no, maintaining the electronic apparatus in the standby state or the lock state; and
    if yes, switching from the standby state to a working state or unlocking the electronic apparatus and executing an operating function corresponding to the dielectric parameter of the selected one of the touch input devices.

5. An electronic apparatus comprising:
    a touch display;
    a processor, coupled to the touch display and configured for:
        detecting a first touch performed on the touch display by a selected one of a plurality of touch input devices, wherein the touch input devices have different dielectric parameters;
        determining the dielectric parameter of the selected one of the touch input devices according to the first touch, wherein
            when the touch display is a capacitive touch display, determining the dielectric parameter of the selected one of the touch input devices according to a dielectric-capacitance comparison table and a capacitance generated by the first touch performed on the touch display; and
            when the touch display is a resistive touch display, determining the dielectric parameter of the selected one of the touch input devices according to a dielectric-resistive comparison table and a resistance generated by the first touch performed on the touch display; and
        executing an operating function corresponding to the dielectric parameter.

6. The electronic apparatus as recited in claim 5, wherein the processor is configured for displaying a trace of the touch input device on the touch display according to a display setting corresponding to the dielectric parameter, wherein the display setting comprises at least one of a color setting, a line style setting or a line thickness setting.

7. The electronic apparatus as recited in claim 5, wherein the processor is configured for executing the operating function according to a function setting corresponding to the dielectric parameter, wherein the function setting comprises at least one of a copy function, a restore function, a cut function, a paste function or an erase function.

8. The electronic apparatus as recited in claim 5, wherein while the electronic apparatus is in a standby state or a lock state, the processor is configured for detecting a first touch and a second touch performed on the touch display, determining the dielectric parameter of the selected one of the touch input devices according to the first touch, distinguishing the first touch and the second touch into a touch point performed on the touch display by the touch input device and a touch block performed on the touch display by a palm according to areas of the first touch and the second touch, and determining whether a relative positional relationship between the touch block and the touch point on the touch display is in compliance with a preset gesture, wherein
    if no, the processor is configured for maintaining the electronic apparatus in the standby state or the lock state;
    if yes, the processor is configured for switching from the standby state to a working state or unlocking the electronic apparatus and executing an operating function corresponding to the dielectric parameter of the selected one of the touch input devices.

* * * * *